United States Patent
Wilhelmsson et al.

(10) Patent No.: US 12,095,559 B2
(45) Date of Patent: Sep. 17, 2024

(54) SYMBOL INTERLEAVING FOR PARAMETER ESTIMATION

(71) Applicant: Telefonaktiebolaget LM Ericsson (publ), Stockholm (SE)

(72) Inventors: Leif Wilhelmsson, Lund (SE); Miguel Lopez, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/249,478

(22) PCT Filed: Oct. 25, 2021

(86) PCT No.: PCT/EP2021/079539
§ 371 (c)(1),
(2) Date: Apr. 18, 2023

(87) PCT Pub. No.: WO2022/090155
PCT Pub. Date: May 5, 2022

(65) Prior Publication Data
US 2023/0396363 A1 Dec. 7, 2023

Related U.S. Application Data

(60) Provisional application No. 63/105,580, filed on Oct. 26, 2020.

(51) Int. Cl.
*H04L 1/00* (2006.01)
(52) U.S. Cl.
CPC .................. *H04L 1/0071* (2013.01)
(58) Field of Classification Search
CPC ... H04L 1/0071; H04L 1/0001; H04L 1/0003; H04L 27/0008; H04L 27/18;
(Continued)

(56) References Cited

U.S. PATENT DOCUMENTS

2006/0092873 A1* 5/2006 Khayrallah ........... H04L 1/0015
370/341
2006/0126489 A1* 6/2006 Quyang ................ H04L 1/0625
370/208

(Continued)

OTHER PUBLICATIONS

Auer, Gunther, et al., "Pilot Aided Channel Estimation for OFDM: a Separated Approach for Smoothing and Interpolation", IEEE International Conference on Communications, 2005, pp. 2173-2178.

*Primary Examiner* — Thien Nguyen
(74) *Attorney, Agent, or Firm* — Murphy, Bilak & Homiller, PLLC

(57) ABSTRACT

A method is for controlling interleaving, within a packet for transmission, of second type symbols amongst first type symbols. The first type symbols comprise error correction encoded data modulated using a first modulation alphabet and the second type symbols are for communication parameter estimation and comprise error correction encoded data modulated using a second modulation alphabet which is smaller than the first modulation alphabet. The data modulated using the second modulation alphabet is encoded with a same error correcting code as the data modulated using the first modulation alphabet. The method comprises determining (340) one or more of: an interleaving density of the second type symbols, a type of the second modulation alphabet, and a size of the second modulation alphabet. The determination is based on one or more of: a worst case phase drift for the packet, a worst case amplitude variation for the packet, and a required signal quality for the first type symbols to meet a performance target for the packet. A method of a receiver, apparatuses for performing the methods, and a communication device are also disclosed.

26 Claims, 8 Drawing Sheets

(a)

(b)

(58) Field of Classification Search
CPC ..... H04L 2027/0067; H04L 2027/0087; H04L 1/0045; H04L 1/0041
See application file for complete search history.

(56) References Cited

U.S. PATENT DOCUMENTS

| | | |
|---|---|---|
| 2009/0310707 A1 | 12/2009 | Cheng et al. |
| 2013/0235919 A1 | 9/2013 | Plevel |
| 2015/0139352 A1* | 5/2015 | Matsuo ............... H04B 17/12 375/295 |
| 2016/0233979 A1* | 8/2016 | Koike-Akino ........ H04L 1/0035 |

* cited by examiner

SYMBOL INTERLEAVING FOR PARAMETER ESTIMATION

TECHNICAL FIELD

The present disclosure relates generally to the field of wireless communication. More particularly, it relates to interleaving of symbols for estimation of one or more communication parameters.

BACKGROUND

A transmitted packet may, when received, demonstrate variation (e.g., drift) through the packet duration of one or more communication parameters (e.g., signal phase). To enable estimation of, and compensation for, such variation (s), known symbols (e.g., pilot symbols) may be inserted at interleaved positions throughout the packet.

Insertion of known symbols entails increased signaling overhead since no data information is carried by such symbols, which may in turn cause spectrum efficiency reductions and/or power efficiency reduction.

U.S. Pat. Pub. 2013/0235919 A1 discloses carrier recovery aided by pilot symbols carrying information, wherein a first modulated symbol has a first resolution and a second modulated symbol has a second resolution that is greater than the first resolution. A decision device is configured to determine a most probable symbol represented by the first modulated symbol, a phase detector is configured to compare the first modulated symbol and the most probable symbol to generate a phase error value, and a phase modifier is configured to determine a phase correction value based on the phase error value and adjust the phase of the second modulated symbol based on the phase correction value.

However, undesirable reception performance may be experienced when applying these disclosed techniques. Therefore, there is a need for alternative and/or improved approaches to interleaving of symbols for estimation of one or more communication parameters.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for controlling interleaving, within a packet for transmission, of second type symbols amongst first type symbols. The first type symbols comprise error correction encoded data modulated using a first modulation alphabet. The second type symbols are for communication parameter estimation and comprise error correction encoded data modulated using a second modulation alphabet which is smaller than the first modulation alphabet. The data modulated using the second modulation alphabet is encoded with a same error correcting code as the data modulated using the first modulation alphabet.

The method comprises determining one or more of: an interleaving density of the second type symbols, a type of the second modulation alphabet, and a size of the second modulation alphabet. The determination is based on one or more of: a worst case phase drift for the packet, a worst case amplitude variation for the packet, and a required signal quality for the first type symbols to meet a performance target for the packet.

In some embodiments, two or more of: the interleaving density of the second type symbols, the type of the second modulation alphabet, and the size of the second modulation alphabet are determined jointly.

In some embodiments, the determination fulfills one or more of the following conditions: the interleaving density increases with increasing worst case phase drift, the interleaving density increases with increasing size of the second modulation alphabet, the size of the second modulation alphabet decreases with increasing worst case phase drift, and the size of the second modulation alphabet decreases with increasing required signal quality.

In some embodiments, determining the interleaving density comprises selecting a distance between second type symbols in the packet, wherein a predicted phase drift associated with the selected distance is lower than half of a minimum phase difference of the second modulation alphabet.

In some embodiments, the predicted phase drift associated with the selected distance is: the worst case phase drift over the selected distance, or the worst case phase drift over half of the selected distance.

In some embodiments, determining the size and/or type of the second modulation alphabet comprises selecting a prospect modulation alphabet, wherein a demodulation performance of the selected prospect modulation alphabet at the required signal quality meets a performance condition.

In some embodiments, the performance condition comprises one or more of: the demodulation performance of the selected prospect modulation alphabet being more robust than a demodulation and error correction decoding performance of the first type symbols at the required signal quality, and the demodulation performance of the selected prospect modulation alphabet being more robust than a threshold value.

In some embodiments, the interleaving is in time domain and/or in frequency domain.

In some embodiments, data carried by the second type symbols is associated with stricter error rate requirements than data carried by the first type symbols.

In some embodiments, the communication parameter estimation comprises a phase error estimation and/or an amplitude error estimation.

In some embodiments, the method is performed by a transmitter of the packet, and the method further comprises transmitting the packet using one or more of: the determined interleaving density of the second type symbols, the determined type of the second modulation alphabet, and the determined size of the second modulation alphabet.

In some embodiments, the method further comprises receiving an interleaving request message from an intended receiver of the packet, and the determining step is performed responsive to receiving the interleaving request message.

In some embodiments, the method is performed by an intended receiver of the packet, and the method further comprises transmitting an interleaving configuration message to a transmitter of the packet, wherein the interleaving configuration message is indicative of one or more of: the determined interleaving density of the second type symbols, the determined type of the second modulation alphabet, and the determined size of the second modulation alphabet.

A second aspect is a method of a receiver of a packet with second type symbols interleaved amongst first type symbols. The first type symbols comprise error correction encoded data modulated using a first modulation alphabet. The second type symbols are for communication parameter estimation and comprise error correction encoded data modulated using a second modulation alphabet which is smaller than the first modulation alphabet. The data modulated using the second modulation alphabet is encoded with a same error correcting code as the data modulated using the first modulation alphabet. One or more of: an interleaving density of the second type symbols, a type of the second modulation alphabet, and a size of the second modulation alphabet are based on one or more of: a worst case phase drift for the packet, a worst case amplitude variation for the packet, and a required signal quality for the first type symbols to meet a performance target for the packet.

The method comprises demodulating the second type symbols to acquire symbol decisions for the second type symbols, and setting decoder input soft symbol values for the second type symbols corresponding to the symbol decisions being correct.

In some embodiments, the method further comprises one or more of: applying a phase correction for the packet, wherein the phase correction is based on respective phase differences between the second type symbols and the corresponding symbol decisions, and applying an amplitude correction for the packet, wherein the amplitude correction is based on respective amplitude differences between the second type symbols and the corresponding symbol decisions.

In some embodiments, the phase correction for each first type symbol of the packet corresponds to an interpolation of phase differences for two second type symbols and/or wherein the amplitude correction for each first type symbol of the packet corresponds to an interpolation of amplitude differences for two second type symbols.

In some embodiments, one or more features of the second aspect may be combined with one or more features of the first aspect (e.g., when the method of the first aspect is performed by an intended receiver of the packet).

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is a communication apparatus for controlling interleaving, within a packet for transmission, of second type symbols amongst first type symbols. The first type symbols comprise error correction encoded data modulated using a first modulation alphabet. The second type symbols are for communication parameter estimation and comprise error correction encoded data modulated using a second modulation alphabet which is smaller than the first modulation alphabet. The data modulated using the second modulation alphabet is encoded with a same error correcting code as the data modulated using the first modulation alphabet.

The apparatus comprises controlling circuitry configured to cause determination of one or more of: an interleaving density of the second type symbols, a type of the second modulation alphabet, and a size of the second modulation alphabet, wherein the determination is based on one or more of: a worst case phase drift for the packet, a worst case amplitude variation for the packet, and a required signal quality for the first type symbols to meet a performance target for the packet.

In some embodiments, the communication apparatus is for a transmitter of the packet.

In some embodiments, the communication apparatus is for an intended receiver of the packet.

A fifth aspect is a receiver apparatus for a packet with second type symbols interleaved amongst first type symbols. The first type symbols comprise error correction encoded data modulated using a first modulation alphabet. The second type symbols are for communication parameter estimation and comprise error correction encoded data modulated using a second modulation alphabet which is smaller than the first modulation alphabet. The data modulated using the second modulation alphabet is encoded with a same error correcting code as the data modulated using the first modulation alphabet. One or more of: an interleaving density of the second type symbols, a type of the second modulation alphabet, and a size of the second modulation alphabet are based on one or more of: a worst case phase drift for the packet, a worst case amplitude variation for the packet, and a required signal quality for the first type symbols to meet a performance target for the packet.

The apparatus comprises controlling circuitry configured to cause demodulation of the second type symbols to acquire symbol decisions for the second type symbols, and setting of decoder input soft symbol values for the second type symbols corresponding to the symbol decisions being correct.

In some embodiments, one or more features of the fifth aspect may be combined with one or more features of the fourth aspect (e.g., when the communication apparatus of the fourth aspect is for an intended receiver of the packet).

A sixth aspect is a communication device comprising the communication apparatus of the fourth aspect and/or the receiver apparatus of the fifth aspect.

In some embodiments, any of the above aspects may additionally have features identical with or corresponding to any of the various features as explained above for any of the other aspects.

An advantage of some embodiments is that alternative and/or improved approaches are provided for interleaving of symbols for estimation of one or more communication parameters.

An advantage of some embodiments is that estimation of, and compensation for, variation(s) through the packet duration of one or more communication parameters (e.g., signal phase) is enabled and/or improved.

An advantage of some embodiments is that desirable reception performance may be achieved.

An advantage of some embodiments is that at least some signaling overhead is avoided (e.g., the signaling overhead may be reduced).

Since data is carried in all symbols according to some embodiments (and no pilots are needed), the data rate may be increased and/or the total transmit energy for a packet may be reduced.

In some embodiments, the performance in terms of required signal-to-noise ratio (SNR) may be improved due to that the second type symbols have higher reliability than the first type symbols and therefore can improve the overall performance of the error correction coding.

In some embodiments, the performance in terms the transmission time for a packet may be improved (e.g., reduced transmission time) due to that the second type symbols convey information that may be used by the error correction decoding.

An advantage of some embodiments is that combining of the different modulation alphabets with a single error correcting code is enabled, which may enhance performance.

An advantage of some embodiments is that the second type symbols may be used for both parameter estimation and enhancement of the performance of the error correction code.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
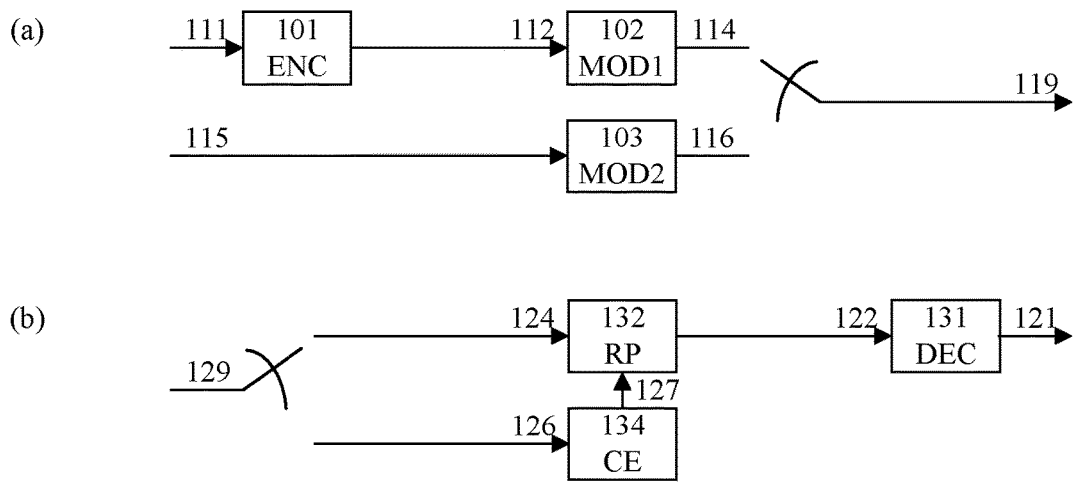
FIG. 1 is a collection of schematic block diagrams illustrating example arrangements for pilot symbol interleaving.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, when modulation (or modulation type) is referred to herein, it is intended to refer to any suitable modulation including—but not limited to—phase shift keying (PSK), quadrature amplitude modulation (QAM), and frequency shift keying (FSK; e.g., Gaussian FSK). Further, a modulation alphabet is meant to refer to the collection of symbols comprised in a modulation space, and the size of a modulation alphabet is the number of symbols in such a collection.

One example definition for the terms "modulation type" and "type of modulation alphabet" comprises specification of a domain (or set of domains) wherein information is conveyed by the modulation. According to this definition, the modulation type PSK is defined as a modulation conveying information in the phase domain, the modulation type QAM is defined as a modulation conveying information in two domains—in-phase amplitude domain and quadrature amplitude domain, and the modulation type FSK is defined as a modulation conveying information in the frequency domain. Similarly, the M-PSK modulation alphabet has size M and is a type of modulation conveying information in the phase domain, the M-QAM modulation alphabet has size M and is a type of modulation conveying information in the in-phase amplitude domain and in the quadrature amplitude domain, and the M-FSK modulation alphabet has size M and is a type of modulation conveying information in the frequency domain.

Also generally, when error correction coding is referred to herein (e.g., in the context of encoding/decoding), it is intended to refer to any suitable error correction coding approach. Example error correcting codes include—but are not limited to—convolutional codes, block codes, low-density parity-check (LDPC) codes, and Turbo codes.

Furthermore, when a communication parameter is referred to herein, it is generally intended to refer to any suitable communication parameter (e.g., a parameter that can be used to improve the demodulation performance of the first type symbols). For example, a suitable communication parameter is a parameter that may drift, or vary otherwise, over the duration of a packet. Examples include—but are not limited to—signal phase (e.g., applicable for coherent communication such as PSK and QAM), signal amplitude (e.g., applicable for QAM with alphabet size larger than four), signal timing, and signal frequency. Any examples disclosed herein (e.g., in relation to phase drift) are equally applicable—mutatis mutandis—in relation to other communication parameters.

FIG. 1 schematically illustrates example arrangements for pilot symbol interleaving. Part (a) illustrates a transmitter arrangement, and part (b) illustrates a receiver arrangement.

In the transmitter arrangement (a), data 111 to be transferred is input to an encoder (ENC; e.g., encoding for an error correcting code) 101, and the encoded data 112 is input to a first modulator (MOD1) 102 to produce encoded and modulated data symbols 114. A binary encoder will be used as example herein (i.e., the symbols 111 and 112 are exemplified as binary symbols). However, this merely for illustrative purposes and not intended as limiting. To enable estimation of communication parameter(s), symbols known to both the transmitter and receiver (e.g., pilot symbols or reference symbols) may be added before transmission. Thus, in the transmitter arrangement pilots 115 are input to a second modulator (MOD2) 103 to produce modulated pilot symbols 116. The transmitter arrangement multiplexes the encoded and modulated data symbols 114 and the modulated pilot symbols 116 to produce a signal for transmission 119.

In the receiver arrangement (b), a signal 129 is received and de-multiplexed into encoded and modulated data symbols 124 and modulated pilot symbols 126. The modulated pilot symbols are input to a channel estimator (CE) 134 that is configured to estimate communication parameter(s) 127 to be used for processing of the encoded and modulated data symbols. The encoded and modulated data symbols 124 are input to a receiver processor (RP) 132 that uses the estimated communication parameter(s) 127 to produce a soft decision value (e.g., a log-likelihood ratio, LLR) for each of the encoded and modulated data symbols. As mention above, binary encoding is used as an example; meaning that the LLRs are exemplified as being for binary symbols. Typically, the receiver processor may perform equalizing, demodulation, and soft value calculation. Also typically, correction(s)/adjustment(s) based on the estimated communication parameter(s) may be applied in association with equalizing and/or demodulation. The soft decision values 122 are input to a decoder (DEC; e.g., a decoder for the error correcting code corresponding to the encoder 101) 131 to produce decoded data 121.

Approaches for implementation of each of the functional blocks in FIG. 1 are well known in the art and will not be exemplified further.

As mentioned before, insertion of known symbols entails increased signaling overhead. In the following, embodiments will be described where this disadvantage is avoided.

As also mentioned before, the approaches suggested by US 2013/0235919 A1 may lead to undesirable reception performance. In particular, just selecting a lower order modulation (e.g., a modulation alphabet with smaller size) to be used for phase tracking may not provide sufficient accuracy for the symbols with higher order modulation (e.g., using a modulation alphabet with larger size). Since the channel conditions effectively are more demanding for the lower order modulation, proper design is required; especially when the system is using a forward error correcting code since then the overall system can be expected to operate at relatively low signal-to-noise ratio (SNR). When the system is designed for relatively large SNR, it may be possible to increase the size of the lower order modulation, thus improving the overall performance further.

Figure 2:
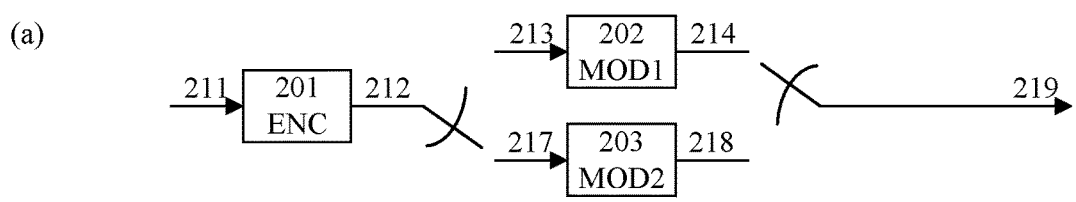
FIG. 2 is a collection of schematic block diagrams illustrating example arrangements according to some embodiments.
Figure 2:
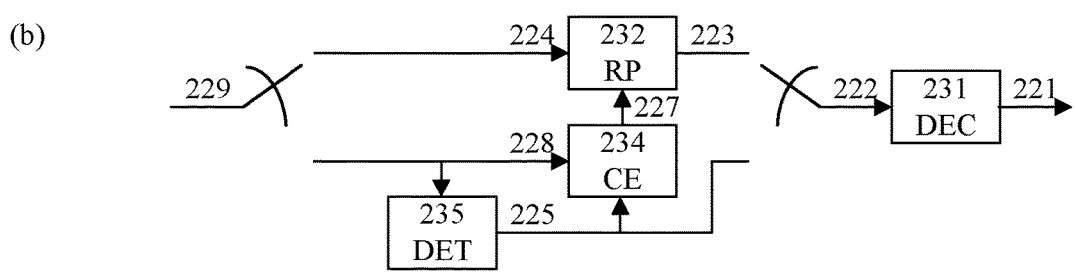
Figure 2:
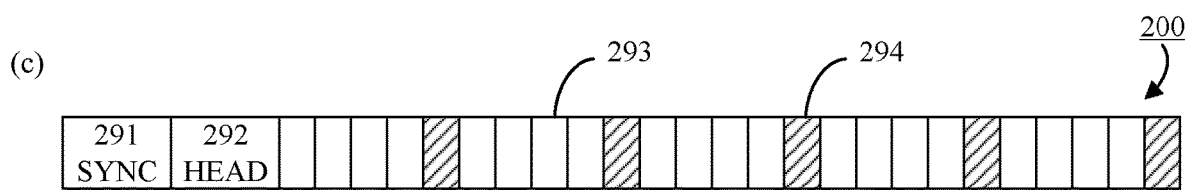

FIG. 2 schematically illustrates example arrangements for symbol interleaving according to some embodiments. Part (a) illustrates a transmitter arrangement, part (b) illustrates a receiver arrangement, and part (c) illustrates an example packet.

In the transmitter arrangement (a), data 211 to be transferred is input to an encoder (ENC; e.g., encoding for an error correcting code) 101, and the encoded data 212 is divided into two groups of encoded data 213, 217. Thus, the two groups of data are encoded with a same error correcting code.

In some embodiments, data of the second group 217 may be associated with stricter error rate requirements (e.g., lower symbol error rate) than data of the first group 213. Alternatively or additionally, the data of the second group may be considered more important than the data of the first group for some reason.

For example, data of the second group 217 may be control information, while data of the first group 213 may be user data. Alternatively or additionally, if the packet transmission relates to a picture of a video stream, the second group 217 may correspond to a base layer (allowing presenting the picture with low resolution) and the first group may correspond to an enhancement layer (providing full resolution).

The first group of encoded data 213 is input to a first modulator (MOD1) 202 to produce first encoded and modulated data symbols 214. The second group of encoded data 217 is input to a second modulator (MOD2) 203 to produce second encoded and modulated data symbols 218. The transmitter arrangement multiplexes the first and second encoded and modulated data symbols 214, 218 to produce a signal for transmission 219.

The first encoded and modulated data symbols may represent first type symbols, the second encoded and modulated data symbols may represent second type symbols, and the multiplexing of the first and second encoded and modulated data symbols may comprise interleaving, within a packet for transmission, of second type symbols amongst first type symbols.

By letting the second modulator apply a second modulation alphabet which is smaller than a first modulation alphabet applied by the first modulator, the second type symbols may be used in a similar way as known symbols; i.e., for communication parameter estimation. Thereby, known symbol need not be transmitted (or can be transmitted more sparsely) and signaling overhead may be reduced.

In the receiver arrangement (b), a signal 229 is received and de-multiplexed into first type symbols 224 and second type symbols 228. The second type symbols 228 are input to a determiner (DET) 235, wherein they are demodulated to acquire decisions (i.e., hard decision values) 225 for the second type symbols. The second type symbols 228 are also input to a channel estimator (CE) 234 that is configured to estimate—based on the hard decision values 225—communication parameter(s) 227 to be used for processing of the encoded and modulated data symbols. Put differently, the second type symbols are demodulated in a decision directed fashion and then used as "pilots". Thereby, the first type symbols can be modulated coherently according to some embodiments.

The first type symbols 224 are input to a receiver processor (RP) 232 that uses the estimated communication parameter(s) 227 to produce a soft decision value (e.g., a log-likelihood ratio, LLR) for each bit carried by the first type symbols. Typically, the receiver processor may perform equalizing, demodulation, and soft value calculation. The soft decision values 223 for the bits carried by the first type symbols and bit decisions corresponding to the hard decision values 225 for the second type symbols—combined into a collection of bit decisions 222—are input to a decoder (DEC; e.g., decoding for the an error correcting code used by the encoder 201) 231 to produce demodulated and decoded data 221.

In some embodiments, the bit decision values input to the decoder for the second type symbols may be taken from the channel estimator. Thereby, the channel quality for the second type symbol may also be taken into account, and the bit decision value may be adjusted accordingly. For example, when the channel is poor for a second type symbol, the absolute value of the corresponding LLR can be reduced to indicate that there is an amount of uncertainty regarding this decision.

An example packet 200 is illustrated in part (c) of FIG. 2, which may be comprised in the signal for transmission 219 and/or in the received signal 229. The packet 200 comprises a synchronization part (SYNC; e.g., a sync field) 291, a header part (HEAD; e.g., a headerfield) 292, and a data part (e.g., a data field). The data part has the second type symbols 294 interleaved amongst the first type symbols 293.

The synchronization part comprises a known sequence and is used by the receiver to perform time and frequency synchronization. Depending on the modulation used for the remaining parts of the packet, it may also be used for channel estimation. How to do synchronization is well known in the art, and will not be discussed further herein.

The header part carries control information that is needed for demodulating the remaining part of the packet. Typical control information carried in the header may be the addresses of the transmitter and the intended receiver, the length of the packet, what modulation and coding are used, etc. The duration of the header part is typically much smaller than the duration of the data part, and it may be justified to use a modulation and coding scheme for the header part that is more robust than needed to meet a performance target (e.g., for providing a performance margin for the header information).

The data part carries data (e.g., user data). This part contributes most to the spectrum efficiency of the transmission since the duration of this part typically comprises a large portion (e.g., around 90%) of the total duration of the packet.

The hard decision values for the second type symbols—assuming that they are correct—may be used as if they were known symbol values. This is manifested in the example of FIG. 2 in that the communication parameter estimation is based on the hard decision values 225, and in that bit decisions corresponding to the hard decision values 225 (e.g., in the form of log-likelihood ratios of plus/minus infinity—or highest possible absolute value) are input to the decoder for the second type symbols. The performance (e.g., in terms of bit error rate or similar) of the decoder 231 may be enhanced by using bit decisions corresponding to (correct) hard decision values as inputs for the second type symbols.

Thus, the first and second modulators, and the ratio between first and second type symbols, should preferably be selected such that the hard decision values for the second type symbols are correct (or at least have a relatively high probability of being correct). Furthermore, the ratio between first and second type symbols should preferably be selected such that the estimated communication parameter(s) are correct (or at least have an absolute difference from the correct value which is lower than a threshold value). Preferably, the selection should be such that these goals are achieved at relatively low (e.g., minimum) rate loss.

According to some embodiments, one or more of these objectives is achieved by determining one or more of: an interleaving density of the second type symbols, a type of the second modulation alphabet, and a size of the second modulation alphabet; based on one or more of: a worst case phase drift for the packet, a worst case amplitude variation for the packet, and a required signal quality for the first type symbols to meet a performance target for the packet. Such determination may be performed by the transmitter of a packet or by the intended receiver of a packet.

Generally, interleaving density may be defined as a ratio between the number of second type symbols in a packet and the number of first type symbols in the packet, or as a ratio between the number bits carried by second type symbols in a packet and the number of bits carried by first type symbols in the packet, for example. Alternatively or additionally, interleaving density may define how far apart second type symbols occur in the packet (e.g., how many first type symbols occur between a pair of subsequent second type symbols) and/or how many second type symbols are grouped together in one occurrence (e.g., letting two or more second type symbols occur in a burst-like fashion; with no first type symbols between them).

By selecting the distance between second type symbols (interleaving density) properly, similar robustness values (e.g., BER) may be provided for two different alphabets (i.e., the first and second modulation alphabets). This means that similar sensitivity can be achieved as if dedicated pilots were used (compare with FIG. 1), but with increased power and/or spectrum efficiency.

Figure 3:
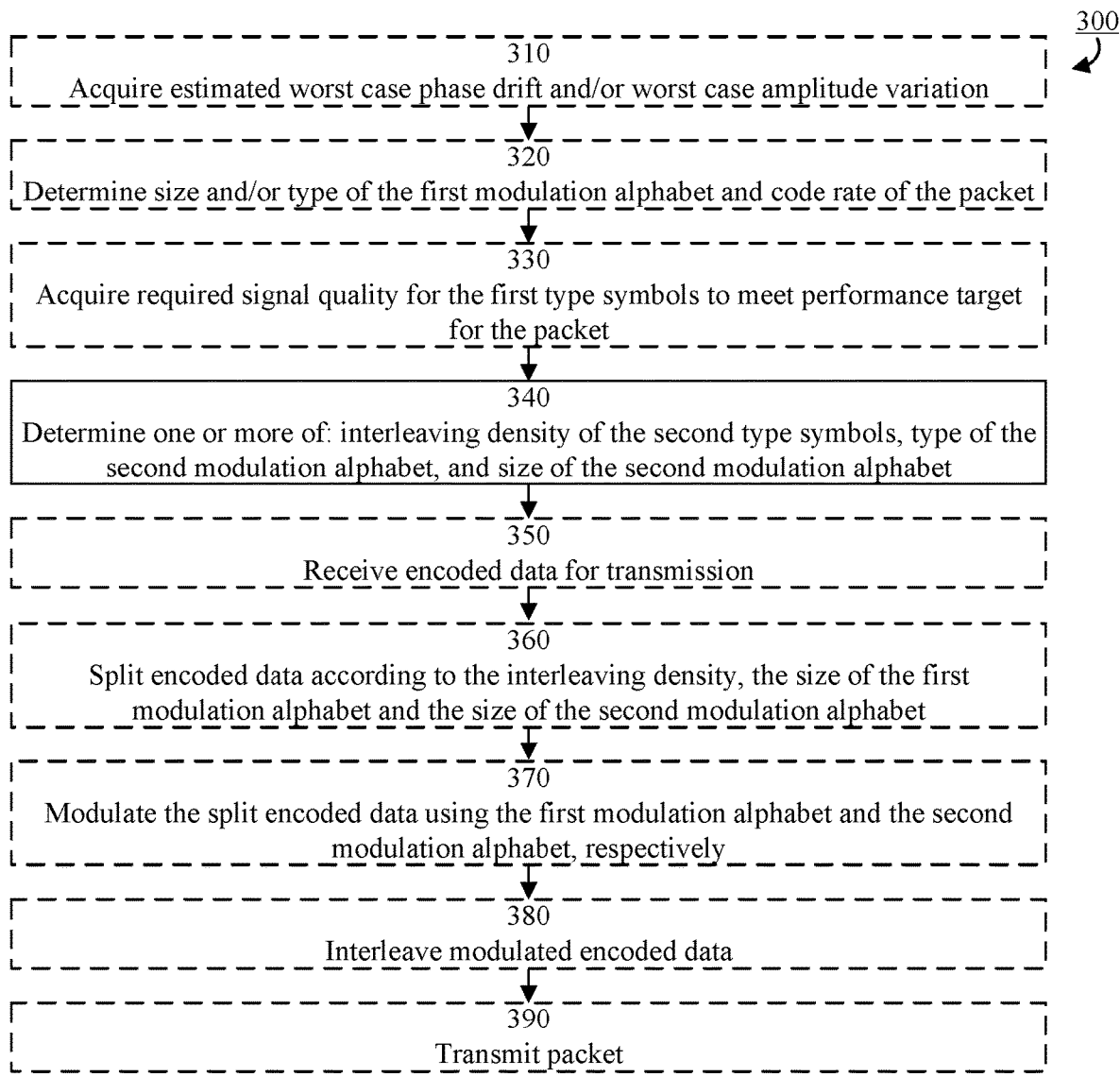
FIG. 3 is a flowchart illustrating example method steps according to some embodiments.

FIG. 3 illustrates an example method 300 according to some embodiments. The method is for controlling interleaving, within a packet for transmission, of second type symbols amongst first type symbols. The first type symbols comprise error correction encoded data modulated using a first modulation alphabet and the second type symbols are for communication parameter estimation (e.g., a phase error estimation and/or an amplitude error estimation) and comprise error correction encoded data modulated using a second modulation alphabet which is smaller than the first modulation alphabet.

For example, the method 300 may be performed by a transmitter of the packet (compare to part (a) of FIG. 2) or an intended receiver of the packet (compare with part (b) of FIG. 2).

In optional step 310, a worst case phase drift and/or a worst case amplitude variation for the packet is acquired (e.g., received or determined). The worst case phase drift and/or the worst case amplitude variation may be determined by standardization or other regulation, and/or may be estimated. For example, when a maximum allowable frequency error is stipulated by regulation, a worst case phase drift for the entire packet may be derived by multiplication of the maximum allowable frequency error with 2T times the packet duration and a worst case phase drift for a symbol of the packet may be derived by multiplication of the maximum allowable frequency error with 2T times the symbol duration. Alternatively or additionally, when a Doppler parameter and/or a relative speed of movement is known/estimated for the transmitter-receiver pair, the worst case amplitude variation may be determined therefrom.

In optional step 320, the size and/or type of the first modulation alphabet is determined as well as the code rate of the packet. This may be performed in accordance with any suitable approach, e.g., an approach of selecting modulation and coding format based on channel measurements as known in the art.

In optional step 330, a required signal quality for the first type symbols to meet a performance target of the packet is acquired (e.g., received or determined). For example, the required signal quality may comprise a phase error value, a signal-to-noise ratio (SNR) value, a signal-to-interference ratio (SIR) value, or similar quality metric, and the performance target may comprise a bit error rate (BER), or similar performance metric, after de-modulation and decoding using the first modulation alphabet and the code rate of step 320.

In step 340, one or more of: an interleaving density of the second type symbols, a type of the second modulation alphabet, and a size of the second modulation alphabet is determined. The determination is based on one or more of: the worst case phase drift for the packet, the worst case amplitude variation for the packet, and the required signal quality for the first type symbols to meet a performance target for the packet.

In some embodiments, two or more of the interleaving density of the second type symbols, the type of the second modulation alphabet, and the size of the second modulation alphabet are determined jointly.

When performed by a transmitter of the packet, the method 300 may further comprise one or more of steps 350-390.

In optional step 350, encoded data for transmission is received (compare with 212 of FIG. 2).

In optional step 360, the encoded data for transmission is split according to the interleaving density and the sizes of the first and second modulation alphabets (compare with 213, 217 of FIG. 2). For example, if the interleaving density specifies that every $x^{th}$ symbol is a second type symbol, if the first modulation alphabet has size that can convey $a_1$ bits per symbol and if the second modulation alphabet has size that can convey $a_2$ bits per symbol, then a portion $a_2/((x-1)a_1 + a_2)$ of the encoded data should be modulated to second type symbols.

In optional step 370, the encoded data is modulated—using the first modulation alphabet for first type symbols (compare with 214 of FIG. 2) and the second modulation alphabet for second type symbols (compare with 218 of FIG. 2).

In optional step 380, the modulated encoded data is interleaved—e.g., in time domain and/or in frequency domain—(compare with 219 of FIG. 2). Generally, interleaving in the frequency domain may comprise interleaving among sub-carriers for orthogonal frequency division multiplexing (OFDM), for example.

In optional step 390, the packet is transmitted using the determined interleaving density of the second type symbols, the determined type of the second modulation alphabet, and the determined size of the second modulation alphabet.

When performed by a transmitter of the packet, the method 300 may comprise (e.g., before step 340, and possibly before one or more of steps 310-330) receiving an interleaving request message from an intended receiver of the packet, and the determining step 340 may be performed responsive to receiving the interleaving request message.

When performed by an intended receiver of the packet, the method 300 may comprise (e.g., after step 340) transmitting an interleaving configuration message to a transmitter of the packet, wherein the interleaving configuration message is indicative of one or more of: the determined interleaving density of the second type symbols, the determined type of the second modulation alphabet, and the determined size of the second modulation alphabet.

In some embodiments, the interleaving density of the second type symbols may be determined by an intended receiver of the packet and the type and/or size of the second modulation alphabet may be determined by the transmitter of the packet; or vice versa.

The determination of step 340 will now be further exemplified.

In some embodiments, step 340 aims at enabling the hard decision values determined at the receiver for the second type symbols to be correct (or at least have a relatively high probability of being correct). This may be achieved by letting the size of the second modulation alphabet be relatively small (e.g., smaller than the size of the first modulation alphabet).

For example, a given SNR may determine a symbol error probability for prospect types and/or sizes of the second modulation alphabet, and the second modulation alphabet may be selected therefrom which has a symbol error probability which is lower than a threshold value (i.e., the demodulation performance of the second modulation alphabet is more robust than a threshold value). Thus, determining the size and/or type of the second modulation alphabet may comprise selecting a prospect modulation alphabet, wherein a demodulation performance (e.g., symbol error probability) of the selected prospect modulation alphabet at the required signal quality (e.g., SNR) meets a performance condition (e.g., lower than threshold value).

When the second type symbols are used for parameter estimation, the selection of the second modulation alphabet may consider how much error is acceptable for the parameter estimation—additionally or alternatively to considering the SNR. For example, when the parameter to be estimated is the phase, the modulation alphabet may be selected based on the SNR under which the system is expected to operate, as well as based on the size of the phase error when making a decision using the second modulation alphabet.

In some embodiments, the performance condition comprises the demodulation performance of the selected prospect modulation alphabet being more robust than a demodulation and error correction decoding performance of the first type symbols at the required signal quality. One example is a performance condition that the second modulation alphabet should have lower symbol error rate at a certain SNR than a BER provided for the first type symbols after demodulation and decoding at the SNR.

Alternatively or additionally, step 340 aims at enabling communication parameter(s) to be estimated correctly at the receiver based on the second type symbols (or at least have an absolute difference from the correct value which is lower than a threshold value). This may be achieved by letting the interleaving density be high enough in relation to the worst case phase drift and/or worst case amplitude variation; such that any possible phase drift and/or amplitude variation cannot (or has a relatively low probability to) cause a second type symbol to be misinterpreted when determining the corresponding hard decision value. Thereby, the communication parameter(s) will generally be correctly estimated.

For example, when the communication parameter is a phase error and the second modulation alphabet is a binary PSK alphabet, the interleaving density may be selected such that the worst case phase drift over the duration between two subsequent second type symbols is less than the phase distance $\pi/2$ from a PSK symbol to the decision boundary. Thus, determining the interleaving density may comprise selecting a distance between second type symbols in the packet, wherein a predicted phase drift over the selected distance is lower than half of a minimum phase difference of the second modulation alphabet. If interpolation is used in the receiver, as exemplified later herein, determining the interleaving density may comprise selecting a distance between second type symbols in the packet, wherein a predicted phase drift over half of the selected distance is lower than half of the minimum phase difference of the second modulation alphabet.

In some embodiments, the interleaving density and the second type symbol modulation may be selected jointly. For example, when the communication parameter is a phase error, the results of a binary PSK modulation alphabet may be comparable with (e.g., equivalent to) the results of a 4-PSK modulation alphabet when the interleaving density is doubled for the latter.

Typically, the determination of step 340 may fulfill one or more of the following conditions: the interleaving density increases with increasing worst case phase drift (and/or with increasing amplitude variation), the interleaving density increases with increasing size of the second modulation alphabet, and the size of the second modulation alphabet decreases with increasing worst case phase drift.

Alternatively or additionally, the required signal quality (e.g., SNR) of the first type symbols to meet a performance target (e.g., BER) for the packet may be considered when determining the interleaving density and/or the type/size of the second modulation alphabet.

For example, if the current conditions include relatively high worst case phase drift, it may be advisable to have second type symbols appearing rather often to be able to compensate for the phase drift. However, if the current conditions include relatively low worst case phase drift but an SNR which does not meet the required signal quality, second type symbols may appear rather seldom, while several second type symbols may be grouped together at each appearance (to enable noise suppression for increasing the SNR). Thus, generally, interleaving density may include a ratio between first and second type symbols and/or a clustering level of the second type symbols (number of second type symbols that are grouped together at each second type symbol appearance).

Thus, when the channel tracking (communication parameter estimation) does not drive requirements for interleaving density, the interleaving density may instead be selected based on the desired decoding performance.

To further illustrate this, it can be assumed it would suffice—from a tracking point of view—that one out of twenty symbols is a second type symbol, and that this results in that the required packet error probability is achieved at SNR=15 dB. If a lower SNR is desired, a default approach might be to reduce the alphabet size of the first modulation and/or reduce the rate of the error correcting code. However, according to some embodiments, an alternative (or additional) approach to reduce the required SNR is to increase the interleaving density. For example, if it is desired to reduce the required SNR from 15 dB to 10 dB, this may be achieved by increasing the density from one per twenty symbols to one per five symbols. Effectively, this can be viewed as an alternative way of reducing the data rate such that the required SNR is reduced.

In some embodiments, the determination of step 340 may fulfill the condition that the size of the second modulation alphabet decreases with increasing required signal quality (e.g., to provide a relatively low error probability for the hard decision values determined at the receiver for the second type symbols).

Alternatively or additionally, the determination of step 340 may fulfill the condition that the size of the second modulation alphabet increases with increasing signal quality. This approach may, for example, be relevant when error probability for the hard decision values determined at the receiver for the second type symbols is already sufficiently low. Then, increased signal quality enables increased size of the second modulation alphabet (e.g., from binary PSK to 4-PSK); with 4-PSK, there is two bits with great LLR per symbol provided by the hard decision values, while only one bit per symbol is provided for binary PSK. Hence, if the quality increases under these conditions, the size of both first and second modulation alphabets may be increased.

It should be noted that one or more of the alternatives of step 340 may be specified by a standard or other regulation, while the other alternative(s) may be open to selection. For example, the interleaving density may be regulated (e.g., based on radio requirements), and the first modulation may be determined by regulated modulation and coding scheme selection, while the second modulation is open for selection.

When open for selection, the determination of step 340 may comprise autonomous selection by the node performing the method 300 or negotiation between the node performing the method 300 and another node (e.g., negotiation between a transmitter of the packet and an intended receiver of the packet; regardless of which one is performing the method 300). Examples of information provided by the intended receiver to the transmitter include information relating to receiver timing accuracy and/or receiver algorithm used for communication parameter tracking.

Figure 4:
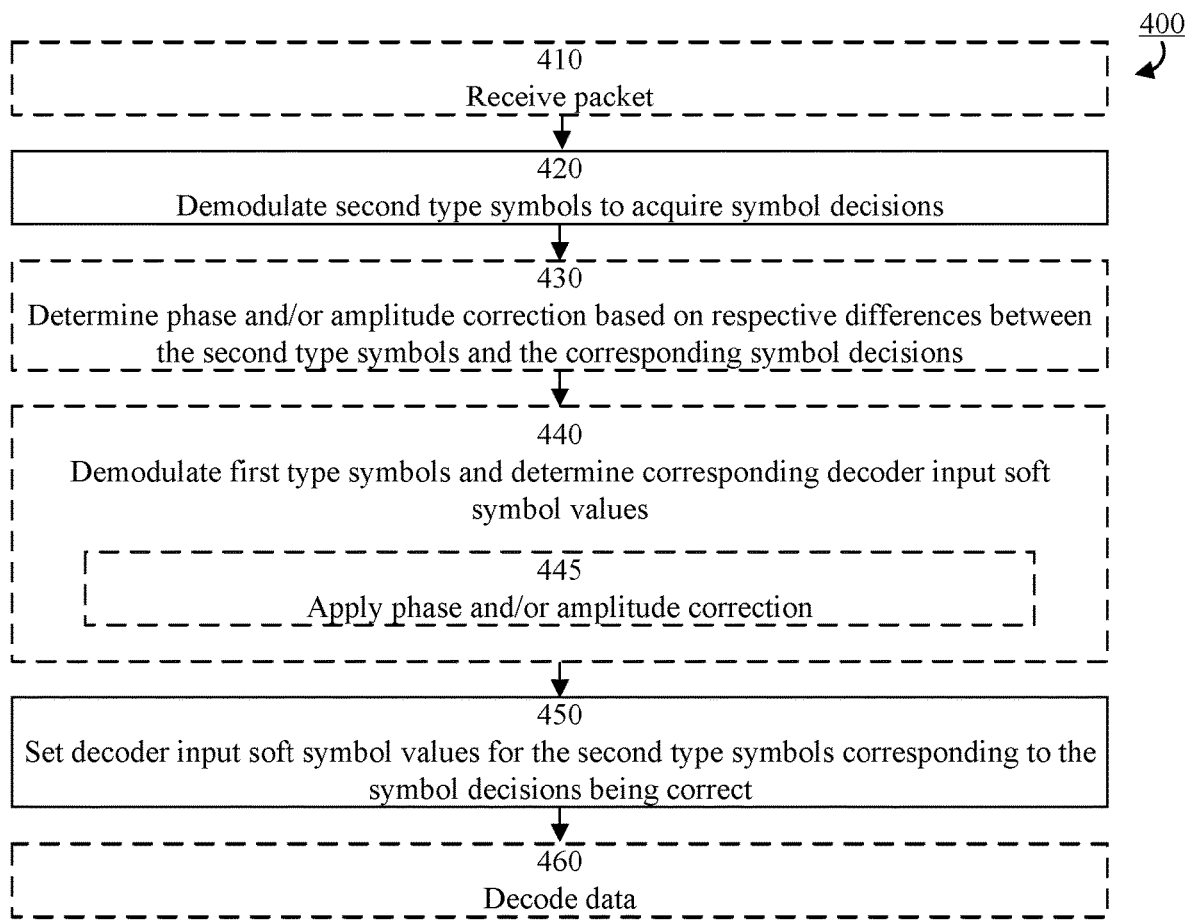
FIG. 4 is a flowchart illustrating example method steps according to some embodiments.

FIG. 4 illustrates an example method 400 according to some embodiments. The method is for a receiver (compare with part (b) of FIG. 2) of a packet with second type symbols interleaved amongst first type symbols as elaborated on above.

In optional step 410, the packet is received.

In step 420, the second type symbols are demodulated to acquire symbol decisions for the second type symbols (compare with 225 of FIG. 2).

In optional step 430, a phase and/or amplitude correction (compare with 227 of FIG. 2) is determined based on respective differences between the second type symbols and the corresponding symbol decisions.

In some embodiments, the phase correction for each first type symbol of the packet corresponds to an interpolation of phase differences for two second type symbols.

In some embodiments, the amplitude correction for each first type symbol of the packet corresponds to an interpolation of amplitude differences for two second type symbols.

In optional step 440, the first type symbols are demodulated and corresponding soft symbol values (compare with 223 of FIG. 2) are determined. The phase and/or amplitude correction of step 430 may be applied in step 440, as illustrated by optional sub-step 445.

In step 450, decoder input soft symbol values for the second type symbols are set as if the symbol decisions are correct (e.g., LLR equal to plus/minus infinity—or highest possible absolute value).

In optional step 460, the data is decoded using the soft symbol values for the first and second type symbols.

Returning to the determination step 340 of FIG. 3, there is a trade-off in the interleaving density regarding how densely the more robust modulation symbols (i.e., the second type symbols) should be sent. If sent too densely, the average data rate may be unnecessarily low. On the other hand, if not sent densely enough, their usefulness as "pilots" for communication parameter estimation may be lost. Furthermore, a relatively small size for the second modulation alphabet (e.g., binary PSK) may enable use of a lower interleaving density than a larger size for the second modulation alphabet (e.g., 4-PSK). In some embodiments, the interleaving density may also depend on expected channel variations.

To exemplify the determination step 340 further with an example, it may be assumed that the symbol rate amounts to 1 M symbol/s, that there is a residual frequency error of +20 kHz after the receiver has used the sync field to perform time/frequency estimation, and that the phase at the end of the header field is known. With these assumptions, the phase error will increase with $20 \cdot 10^3 \cdot 10^{-6} \cdot 360° = 7.2°$ per symbol.

Considering, e.g., 8-PSK for the first type symbols, the phase distance between the closest signal points is 45°, and the phase distance to the decision boundary is thus 22.5°. This means that, after three symbols, the residual frequency error has caused a phase shift of 3·7.2°=21.6° and an error may occur even with very little noise present.

By inserting pilots (or—according to the embodiments herein—second type symbols) every fifth symbol, the phase can be estimated for those symbols. Then, the phase difference between two second type symbols is 5·7.2°=36°, and linear (or higher order) interpolation between second type symbols may be used to achieve phase drift correction for the (buffered) first type symbols between the two second type symbols.

If interpolation (or prediction) is not applied, second type symbols need to be inserted more often to achieve proper phase drift correction. With the assumptions above it may be reasonable to assume that an 8-PSK symbol could withstand a phase error of 7.2°, but that 14.4° would degrade the performance significantly. Thus, without interpolation (or prediction), every second symbol may need to be a second type symbol.

Continuing this example, with 8-PSK as the first modulation, it follows that the average number of information bits per transmitted symbol is (3·4)/5=2.4 when pilot symbols carrying no data are used.

If it can be safely assumed that the residual frequency error after synchronization is within the range ±20 kHz so that the maximum phase error at the fifth symbol is ±36° second type symbols with 4-PSK as the second modulation can be used instead of pilot symbols carrying no data, since the phase distance between 4-PSK symbols is 900 with a phase distance to the decision boundary of 45° (i.e., more than 36°) and the second type symbols can be correctly demodulated to acquire a symbol decision. The corresponding phase error may be estimated by determining the difference between the phase of the received second type symbol and the phase of the symbol decision.

For this example, the average number of information bits per transmitted symbol increases to (2+3·4)/5=2.8, which means that the reduction in data rate is 6.7% instead of 20% as was the case for pilot symbols carrying no data.

Figure 5:
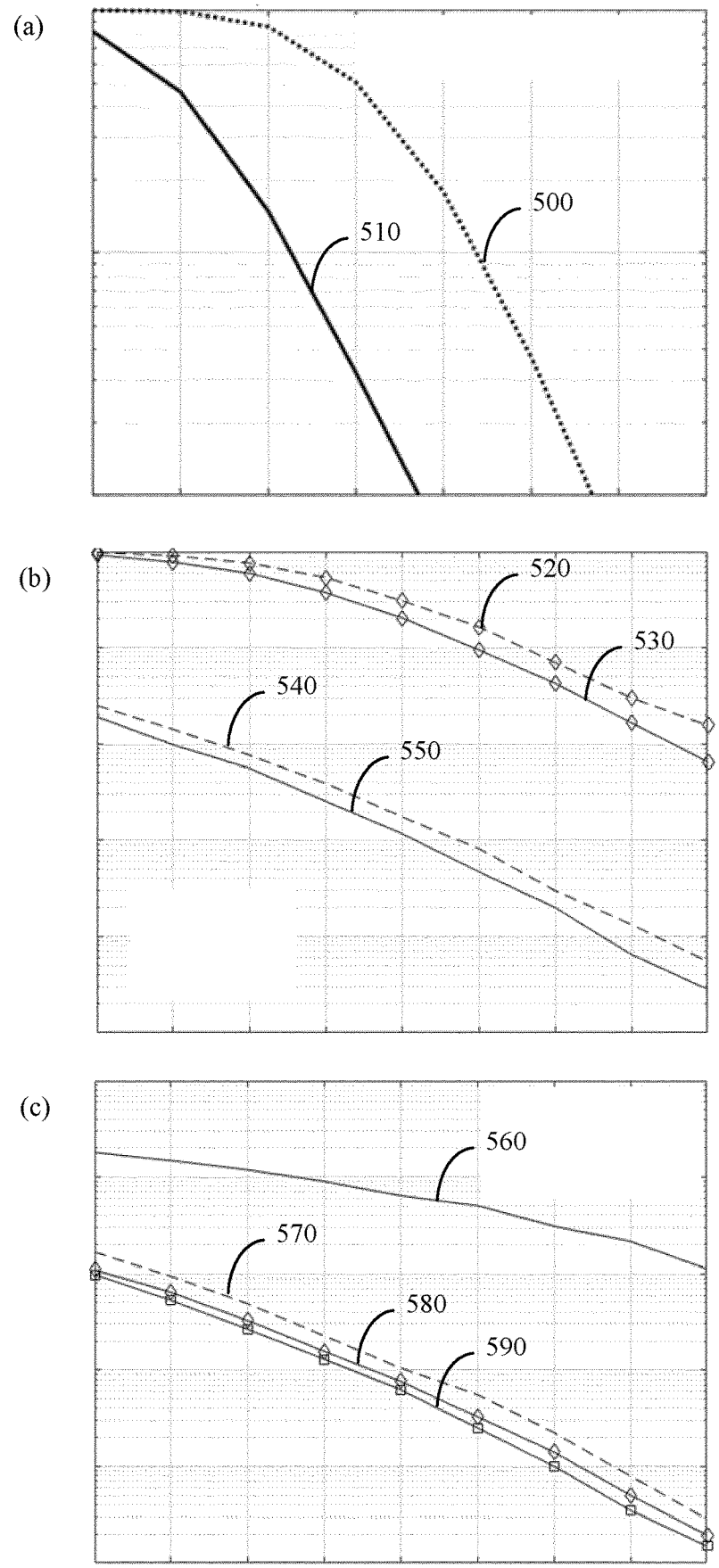
FIG. 5 is a collection of simulation plots illustrating example results achievable according to some embodiments.

FIG. 5, part (a), is a simulation plot illustrating example results achievable according to the examples above. Packet error rate (PER) in logarithmic scale from $10^{-2}$ to $10^0$ is shown as a function of SNR in the range from 15 dB to 22 dB. The simulation has been performed with a payload of 1128 bits, additive white Gaussian noise (AWGN) channel, and a 20 kHz oscillator mismatch between transmitter and receiver.

Performance for (differential) 8-PSK data symbols interleaved with pilot symbols carrying no data is shown at 500, and performance for 8-PSK first type symbols interleaved with 4-PSK second type symbols is shown at 510. In the latter case, the 4-PSK second type symbols are estimated as described above, and the estimates are used to produce initial channel estimates.

The initial channel estimates are then smoothed using a moving average filter. Channel estimates for first type symbols are generated then generated by means of low pass interpolation. It can be seen that the results 510 are improved by approximately 2 dB compared to those of 500.

FIG. 5, part (b), is a simulation plot illustrating example results achievable according to the examples above. Error rate in logarithmic scale from $10^{-5}$ to $10^0$ is shown as a function of SNR in the range from 6 to 10 dB. The simulation has been performed with 8-PSK as the first modulation alphabet and binary PSK as the second modulation alphabet, a distance equal to ten between second type symbols, and two second type symbols in each burst of second type symbols.

Block error rate (BLER) is shown for proposed embodiments 530 compared to an approach where pilot symbols carrying no data are used 520. Bit error rate (BER) is also shown for proposed embodiments 550 compared to an approach where pilot symbols carrying no data are used 540. As can be seen, the proposed embodiments demonstrate lower error rates than the approach where no data is carried by pilot symbols.

FIG. 5, part (c), is a simulation plot illustrating example results achievable according to the examples above. Error rate in logarithmic scale from $10^{-5}$ to $10^0$ is shown as a function of SNR in the range from 12 to 16 dB. The simulation has been performed with 64-QAM as the first modulation alphabet and different variants of PSK as the second modulation alphabet, a distance equal to ten between second type symbols, and two second type symbols in each burst of second type symbols.

Bit error rate (BER) is shown for proposed embodiments where the second modulation alphabet is binary PSK 580, 4-PSK 590 and 8-PSK 560 compared to an approach where pilot symbols carrying no data are used 570. As can be seen, the proposed embodiments 580, 590 demonstrate lower error rates than the approach where no data is carried by pilot symbols, while the proposed embodiment 560 demonstrates significantly higher error rates. The latter is a demonstration of the phenomenon that if the hard decision values for the second type symbols do not have a relatively high probability of being correct, performance may be degraded.

Advantages of some embodiments may be noted by considering the energy used for the transmission of a packet. Analogously to the example above for spectrum efficiency (regarding the number of information bits per transmitted symbol), it may be derived that 2.8/2.4≈17% more data is transmitted using the same amount of energy. Consequently, in terms of $E_b/N_0$, there is a gain of 10 log(1.17)≈0.7 dB.

Additionally, or alternatively, to determining a suitable interleaving density for the second type symbols, step 340 of FIG. 3 may comprise determining which modulation (e.g., size and/or type) to use for the second type symbols.

To exemplify this aspect of step 340, it may be assumed that successful demodulation and decoding of the packet requires an SNR of 15 dB with perfect communication parameter estimation (i.e., if the decision directed estimation would be ideal, a SNR of 15 dB is still needed for successful demodulation and decoding of the packet). When deciding what modulation to use for the second type symbols, it may therefore be reasonable to require that the hard decision for these symbols should be correct with sufficiently high probability at the same SNR (i.e., 15 dB); taking into account that the channel conditions are not perfectly known for the second type symbols.

Referring to the example above, it should be feasible to correctly map the second type symbols of the second modulation at SNR=15 dB even when the maximum phase error is experienced for the phase tracking to work properly. If 4-PSK is not sufficiently reliable at this SNR and at the maximum phase error, a more robust modulation (e.g., binary PSK) may be used and/or the interleaving density for the second type symbols may be increased (so that the maximum phase error would be reduced accordingly).

Figure 6:
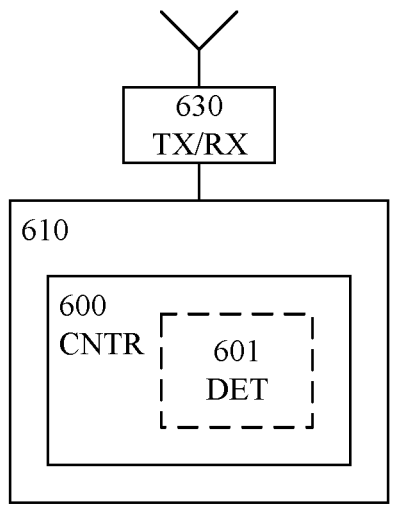
FIG. 6 is a schematic block diagram illustrating an example apparatus according to some embodiments.

FIG. 6 schematically illustrates an example apparatus 610 according to some embodiments. The apparatus is a communication apparatus for controlling interleaving, within a packet for transmission, of second type symbols amongst first type symbols, as explained above. For example, the apparatus may be configured to perform one or more steps as described in connection with FIG. 3.

For example, the apparatus may be for a (typically wireless) communication device. Example communication devices include user devices (e.g., a user equipment, UE, a station, STA, etc.) and network nodes (e.g., a base station, an access point, etc.).

The apparatus comprises a controller (CNTR; e.g., controlling circuitry or a control module) 600. The controller 600 is configured to cause determination of one or more of: an interleaving density of the second type symbols, a type of the second modulation alphabet, and a size of the second modulation alphabet (compare with step 340 of FIG. 3). The determination is based on one or more of: a worst case phase drift for the packet, a worst case amplitude variation for the packet, and a required signal quality for the first type symbols to meet a performance target for the packet.

To this end, the controller comprises, or is otherwise associated with (e.g., connected, or connectable, to), a determiner (DET; e.g., determining circuitry or a control module) 601. The determiner may be configured to determine the one or more of: an interleaving density of the second type symbols, a type of the second modulation alphabet, and a size of the second modulation alphabet as described herein.

In some embodiments, the apparatus 610 may comprise one or more further components as described, or derivable from the description, herein.

When the apparatus 610 is for a transmitter of the packet, the apparatus may comprise, or is otherwise associated with (e.g., connected, or connectable, to), one or more of the components as described in part (a) of FIG. 2.

In some embodiments, the controller is further configured to cause transmission of the packet using one or more of: the determined interleaving density of the second type symbols, the determined type of the second modulation alphabet, and the determined size of the second modulation alphabet.

To this end, the controller comprises, or is otherwise associated with (e.g., connected, or connectable, to), a transmitter (e.g., transmitting circuitry or a transmission module)—illustrated in FIG. 6 as comprised in a transceiver (TX/RX) 630. The transmitter may be configured to transmit the packet.

In some embodiments, the controller is further configured to cause reception of an interleaving request message from an intended receiver of the packet as described above.

To this end, the controller comprises, or is otherwise associated with (e.g., connected, or connectable, to), a receiver (e.g., receiving circuitry or a reception module)—illustrated in FIG. 6 as comprised in the transceiver (TX/RX) 630. The receiver may be configured to receive the interleaving request.

When the apparatus 610 is for an intended receiver of the packet, the apparatus may comprise, or is otherwise associated with (e.g., connected, or connectable, to), one or more of the components as described in part (b) of FIG. 2.

In some embodiments, the controller is further configured to cause transmission of an interleaving configuration message to a transmitter of the packet, wherein the interleaving configuration message is indicative of one or more of: the determined interleaving density of the second type symbols, the determined type of the second modulation alphabet, and the determined size of the second modulation alphabet.

To this end, the controller comprises, or is otherwise associated with (e.g., connected, or connectable, to), a transmitter (e.g., transmitting circuitry or a transmission module)—illustrated in FIG. 6 as comprised in a transceiver (TX/RX) 630. The transmitter may be configured to transmit the interleaving configuration message.

Figure 7:
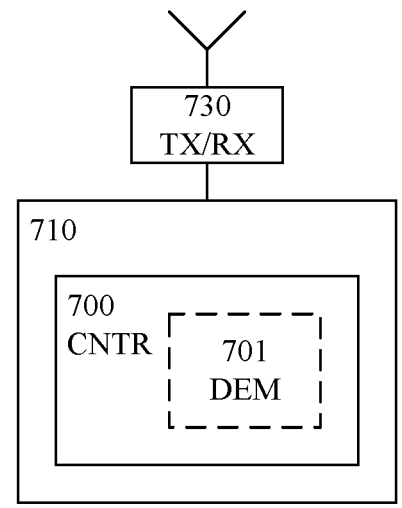
FIG. 7 is a schematic block diagram illustrating an example apparatus according to some embodiments.

FIG. 7 schematically illustrates an example apparatus 710 according to some embodiments. The apparatus is a receiver apparatus for a packet with second type symbols interleaved amongst first type symbols, as explained above. For example, the apparatus may be configured to perform one or more steps as described in connection with FIG. 4.

For example, the apparatus may be for a (typically wireless) communication device. Example communication devices include user devices (e.g., a user equipment, UE, a station, STA, etc.) and network nodes (e.g., a base station, an access point, etc.).

The apparatus is configured to receive the packet with second type symbols interleaved amongst first type symbols. To this end, the apparatus comprises, or is otherwise associated with (e.g., connected, or connectable, to), a receiver (e.g., receiving circuitry or a reception module)—illustrated in FIG. 7 as comprised in a transceiver (TX/RX) 730. The receiver may be configured to receive the packet with second type symbols interleaved amongst first type symbols for the apparatus.

The apparatus comprises a controller (CNTR; e.g., controlling circuitry or a control module) 700. The controller 700 is configured to cause demodulation of the second type symbols to acquire symbol decisions for the second type symbols (compare with step 420 of FIG. 4), and setting of decoder input soft symbol values for the second type symbols corresponding to the symbol decisions being correct (compare with step 450 of FIG. 4).

To this end, the controller comprises, or is otherwise associated with (e.g., connected, or connectable, to), a demodulator (DEM; e.g., demodulating circuitry or a demodulation module) 701 (compare with the determiner 235 of FIG. 2). The demodulator may be configured to demodulate the second type symbols to acquire symbol decisions for the second type symbols and set decoder input soft symbol values for the second type symbols corresponding to the symbol decisions being correct.

In some embodiments, the apparatus 710 may comprise one or more further components as described, or derivable from the description, herein. For example, the apparatus may comprise, or be otherwise associated with (e.g., connected, or connectable, to), one or more of the components as described in part (b) of FIG. 2.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 8:
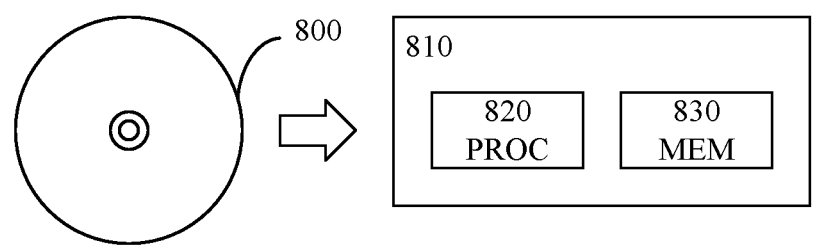
FIG. 8 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 8 illustrates an example computer readable medium in the form of a compact disc (CD) ROM 800. The computer readable medium has stored thereon a computer program comprising program instructions. The computer program is loadable into a data processor (PROC; e.g., data processing circuitry or a data processing unit) 820, which may, for example, be comprised in a wireless communication device or a network node 810. When loaded into the data processor, the computer program may be stored in a memory (MEM) 830 associated with or comprised in the data processor. According to some embodiments, the computer program may, when loaded into and run by the data processor, cause execution of method steps according to, for example, any of the methods illustrated in FIG. 3 or 4; or otherwise described herein.

Figure 9:
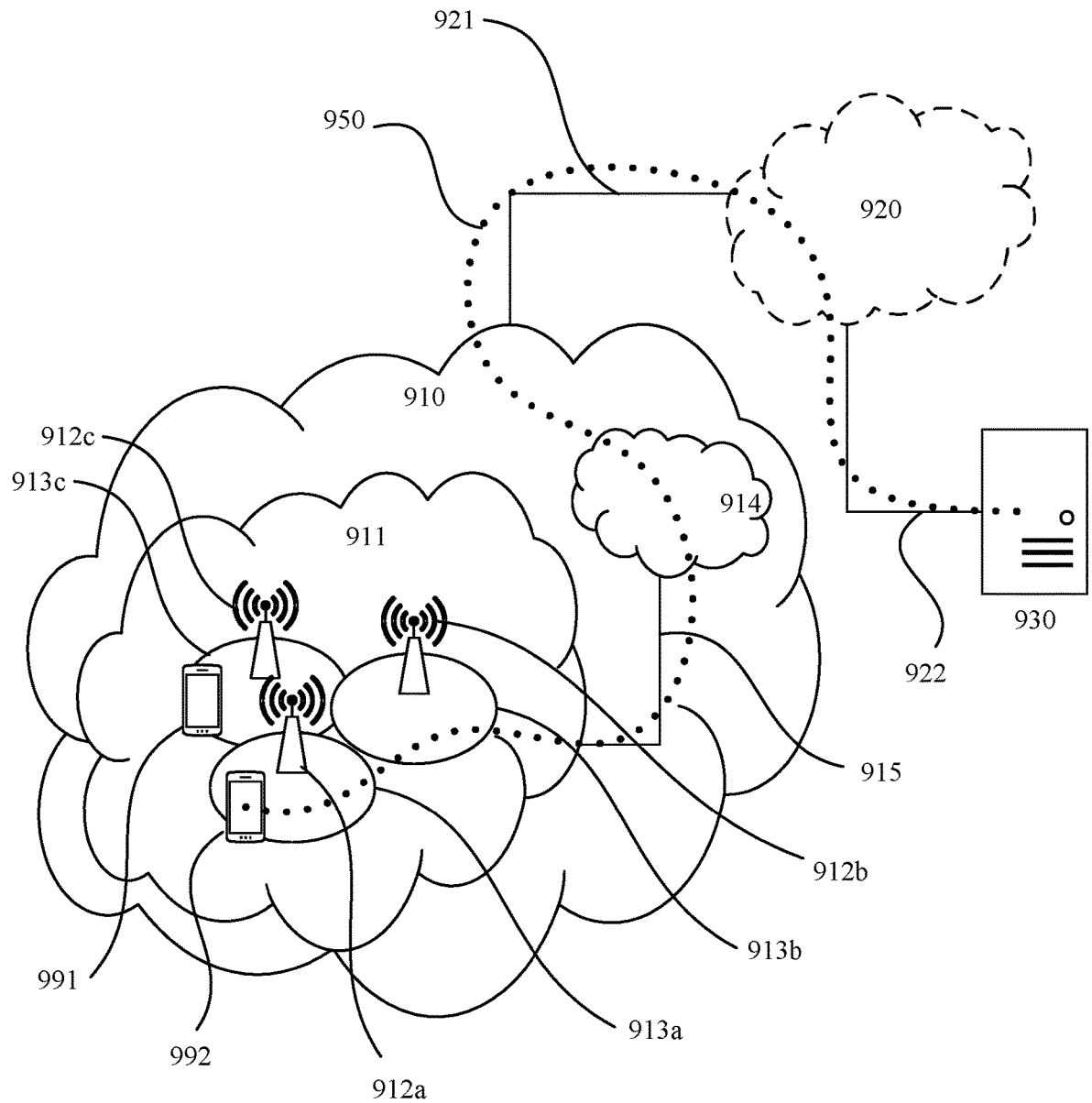
FIG. 9 illustrates a telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
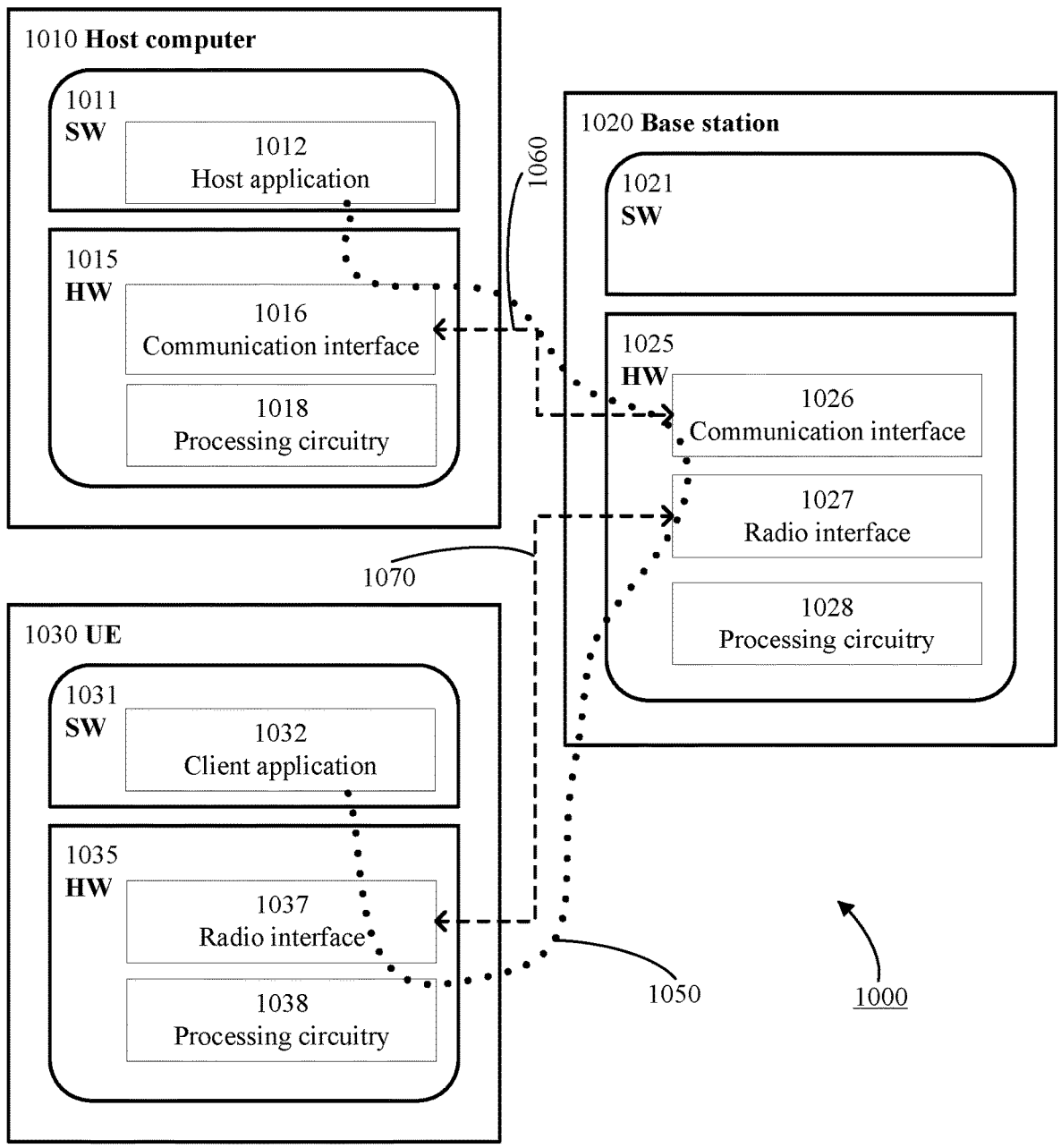
FIG. 10 illustrates a host computer communicating via a base station with a user equipment over a partially wireless connection in accordance with some embodiments.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the estimation of one or more communication parameters and thereby provide benefits such as increased throughput and/or reduced power consumption.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
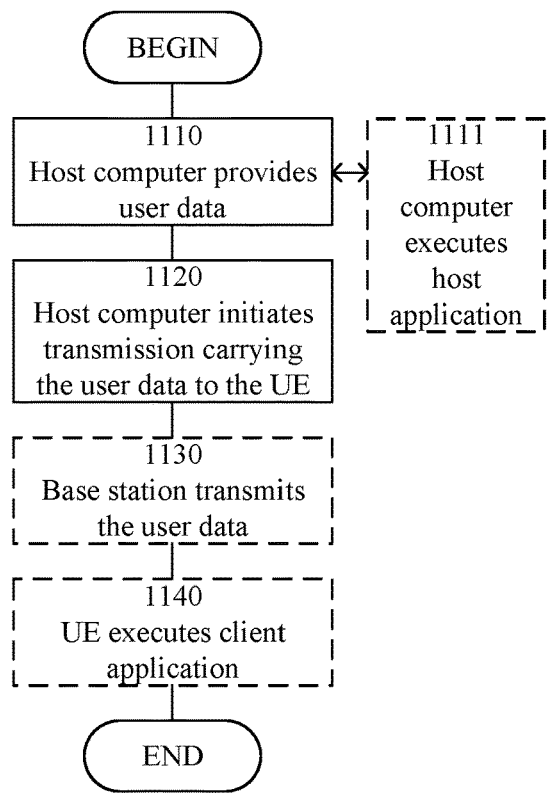
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
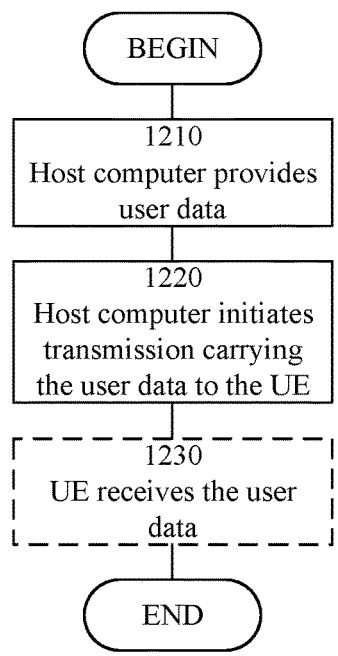
FIG. 12 is a flowchart illustrating example method steps implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
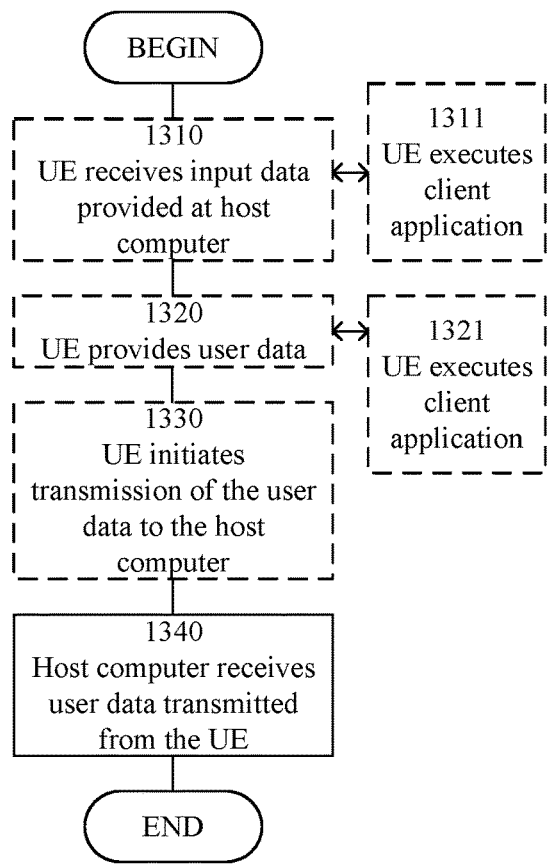
FIG. 13 is a flowchart illustrating example method steps implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
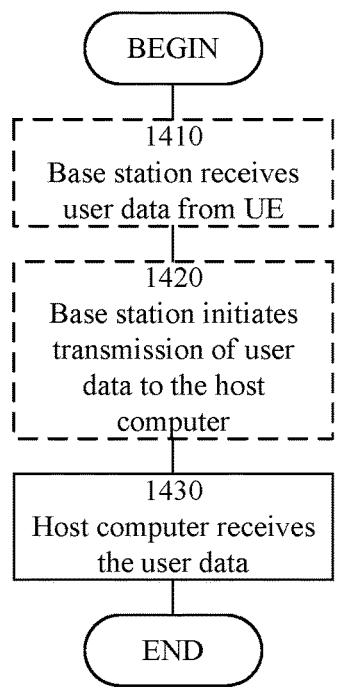
FIG. 14 is a flowchart illustrating example method steps implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the disclosure.

For example, the method embodiments described herein discloses example methods through steps being performed in a certain order. However, it is recognized that these sequences of events may take place in another order without departing from the scope of the disclosure. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the disclosure are intended to be embraced therein.

Example Embodiments

Group A Embodiments

A1. A method performed by a wireless device for controlling interleaving, within a packet for transmission, of second type symbols amongst first type symbols, wherein the first type symbols comprise error correction encoded data modulated using a first modulation alphabet and the second type symbols are for communication parameter estimation and comprise error correction encoded data modulated using a second modulation alphabet which is smaller than the first modulation alphabet, and wherein the data modulated using the second modulation alphabet is encoded with a same error correcting code as the data modulated using the first modulation alphabet, the method comprising:
determining one or more of: an interleaving density of the second type symbols, a type of the second modulation alphabet, and a size of the second modulation alphabet,
wherein the determination is based on one or more of: a worst case phase drift for the packet, a worst case amplitude variation for the packet, and a required signal quality for the first type symbols to meet a performance target for the packet.

A2. A method performed by a wireless device configured as a receiver of a packet with second type symbols interleaved amongst first type symbols, wherein the first type symbols comprise error correction encoded data modulated using a first modulation alphabet and the second type symbols are for communication parameter estimation and comprise error correction encoded data modulated using a second modulation alphabet which is smaller than the first modulation alphabet, wherein the data modulated using the second modulation alphabet is encoded with a same error correcting code as the data modulated using the first modulation alphabet, and wherein one or more of: an interleaving density of the second type symbols, a type of the second modulation alphabet, and a size of the second modulation alphabet are based on one or more of: a worst case phase drift for the packet, a worst case amplitude variation for the packet, and a required signal quality for the first type symbols to meet a performance target for the packet, the method comprising:
demodulating the second type symbols to acquire symbol decisions for the second type symbols; and
setting decoder input soft symbol values for the second type symbols corresponding to the symbol decisions being correct.

A3. The method of any of the previous embodiments in Group A, further comprising:
providing user data; and
forwarding the user data to a host computer via the transmission to the base station.

Group B Embodiments

B1. A method performed by a base station for controlling interleaving, within a packet for transmission, of second type symbols amongst first type symbols, wherein the first type symbols comprise error correction encoded data modulated using a first modulation alphabet and the second type symbols are for communication parameter estimation and comprise error correction encoded data modulated using a second modulation alphabet which is smaller than the first modulation alphabet, and wherein the data modulated using the second modulation alphabet is encoded with a same error correcting code as the data modulated using the first modulation alphabet, the method comprising:
determining one or more of: an interleaving density of the second type symbols, a type of the second modulation alphabet, and a size of the second modulation alphabet, wherein the determination is based on one or more of: a worst case phase drift for the packet, a worst case amplitude variation for the packet, and a required signal quality for the first type symbols to meet a performance target for the packet.

B2. A method performed by a wireless device configured as a receiver of a packet with second type symbols interleaved amongst first type symbols, wherein the first type symbols comprise error correction encoded data modulated using a first modulation alphabet and the second type symbols are for communication parameter estimation and comprise error correction encoded data modulated using a second modulation alphabet which is smaller than the first modulation alphabet, and wherein one or more of: an interleaving density of the second type symbols, a type of the second modulation alphabet, and a size of the second modulation alphabet are based on one or more of: a worst case phase drift for the packet, a worst case amplitude variation for the packet, and a required signal quality for the first type symbols to meet a performance target for the packet, the method comprising:

demodulating the second type symbols to acquire symbol decisions for the second type symbols; and setting decoder input soft symbol values for the second type symbols corresponding to the symbol decisions being correct.

B3. The method of any of the previous embodiments in Group B, further comprising:

obtaining user data; and forwarding the user data to a host computer or a wireless device.

Group C Embodiments

C1. A wireless device comprising:

processing circuitry configured to perform any of the steps of any of the Group A embodiments; and power supply circuitry configured to supply power to the wireless device.

C2. A base station comprising:

processing circuitry configured to perform any of the steps of any of the Group B embodiments;

power supply circuitry configured to supply power to the base station.

C3. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

Group D Embodiments

D1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
communication interface configured to receive user data originating from a transmission from a user equipment (UE) to a base station, wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
the processing circuitry of the host computer is configured to execute a host application; and
the UE's processing circuitry is configured to execute a client application associated with
the host application, thereby providing the user data.

D18. The communication system of any of embodiments D14 through D17, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
at the UE, executing a client application, thereby providing the user data to be transmitted; and
at the host computer, executing a host application associated with the client application.

D22. The method of any of embodiments D19 through D21, further comprising:
at the UE, executing a client application; and
at the UE, receiving input data to the client application, the input data being provided at the host computer by executing a host application associated with the client application, wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
the processing circuitry of the host computer is configured to execute a host application;
the UE is configured to execute a client application associated with the host application, thereby providing the user data to be received by the host computer.

D28. A method implemented in a communication system including a host computer, a base station and a user equipment (UE), the method comprising:
at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

This Disclosure May be Summarized Through the Following Items:
1. A method for controlling interleaving, within a packet for transmission, of second type symbols amongst first type symbols, wherein the first type symbols comprise error correction encoded data modulated using a first modulation alphabet and the second type symbols are for communication parameter estimation and comprise error correction encoded data modulated using a second modulation alphabet which is smaller than the first modulation alphabet, and wherein the data modulated using the second modulation alphabet is encoded with a same error correcting code as the data modulated using the first modulation alphabet, the method comprising:
determining (340) one or more of: an interleaving density of the second type symbols, a type of the second modulation alphabet, and a size of the second modulation alphabet, wherein the determination is based on one or more of: a worst case phase drift for the packet, a worst case amplitude variation for the packet, and a required signal quality for the first type symbols to meet a performance target for the packet.

2. The method of item 1, wherein two or more of: the interleaving density of the second type symbols, the type of the second modulation alphabet, and the size of the second modulation alphabet are determined jointly.

3. The method of any of items 1 through 2, wherein the determination fulfills one or more of the following conditions:
the interleaving density increases with increasing worst case phase drift,
the interleaving density increases with increasing size of the second modulation alphabet,
the size of the second modulation alphabet decreases with increasing worst case phase drift, and
the size of the second modulation alphabet decreases with increasing required signal quality.

4. The method of any of items 1 through 3, wherein determining the interleaving density comprises selecting a distance between second type symbols in the packet, wherein a predicted phase drift associated with the selected distance is lower than half of a minimum phase difference of the second modulation alphabet.

5. The method of item 4, wherein the predicted phase drift associated with the selected distance is:
the worst case phase drift over the selected distance, or
the worst case phase drift over half of the selected distance.

6. The method of any of items 1 through 5, wherein determining the size and/or type of the second modulation alphabet comprises selecting a prospect modulation alphabet, wherein a demodulation performance of the selected prospect modulation alphabet at the required signal quality meets a performance condition.

7. The method of item 6, wherein the performance condition comprises one or more of: the demodulation performance of the selected prospect modulation alphabet being more robust than a demodulation and error correction decoding performance of the first type symbols at the required signal quality; and the demodulation performance of the selected prospect modulation alphabet being more robust than a threshold value.

8. The method of any of items 1 through 7, wherein the interleaving is in time domain and/or in frequency domain.

9. The method of any of items 1 through 8, wherein data carried by the second type symbols is associated with stricter error rate requirements than data carried by the first type symbols.

10. The method of any of items 1 through 9, wherein the communication parameter estimation comprises a phase error estimation and/or an amplitude error estimation.

11. The method of any of items 1 through 10, wherein the method is performed by a transmitter of the packet, the method further comprising transmitting the packet using one or more of: the determined interleaving density of the second type symbols, the determined type of the second modulation alphabet, and the determined size of the second modulation alphabet.

12. The method of item 11, further comprising receiving an interleaving request message from an intended receiver of the packet, wherein the determining step is performed responsive to receiving the interleaving request message.

13. The method of any of items 1 through 10, wherein the method is performed by an intended receiver of the packet, the method further comprising transmitting an interleaving configuration message to a transmitter of the packet, wherein the interleaving configuration message is indicative of one or more of: the determined interleaving density of the second type symbols, the determined type of the second modulation alphabet, and the determined size of the second modulation alphabet.

14. A method of a receiver of a packet with second type symbols interleaved amongst first type symbols, wherein the first type symbols comprise error correction encoded data modulated using a first modulation alphabet and the second type symbols are for communication parameter estimation and comprise error correction encoded data modulated using a second modulation alphabet which is smaller than the first modulation alphabet, wherein the data modulated using the second modulation alphabet is encoded with a same error correcting code as the data modulated using the first modulation alphabet, and wherein one or more of: an interleaving density of the second type symbols, a type of the second modulation alphabet, and a size of the second modulation alphabet are based on one or more of: a worst case phase drift for the packet, a worst case amplitude variation for the packet, and a required signal quality for the first type symbols to meet a performance target for the packet, the method comprising:
demodulating (420) the second type symbols to acquire symbol decisions for the second type symbols; and
setting (450) decoder input soft symbol values for the second type symbols corresponding to the symbol decisions being correct.

15. The method of item 14, further comprising one or more of:
applying (445) a phase correction for the packet, wherein the phase correction is based on respective phase differences between the second type symbols and the corresponding symbol decisions, and
applying (445) an amplitude correction for the packet, wherein the amplitude correction is based on respective amplitude differences between the second type symbols and the corresponding symbol decisions.

16. The method of item 15, wherein the phase correction for each first type symbol of the packet corresponds to an interpolation of phase differences for two second type symbols and/or wherein the amplitude correction for each first type symbol of the packet corresponds to an interpolation of amplitude differences for two second type symbols.

17. A computer program product comprising a non-transitory computer readable medium (800), having thereon a computer program comprising program instructions, the computer program being loadable into a data processing unit and configured to cause execution of the method according to any of items 1 through 16 when the computer program is run by the data processing unit.

18. A communication apparatus for controlling interleaving, within a packet for transmission, of second type symbols amongst first type symbols, wherein the first type symbols comprise error correction encoded data modulated using a first modulation alphabet and the second type symbols are for communication parameter estimation and comprise error correction encoded data modulated using a second modulation alphabet which is smaller than the first modulation alphabet, and wherein the data modulated using the second modulation alphabet is encoded with a same error correcting code as the data modulated using the first modulation alphabet, the apparatus comprising controlling circuitry (600) configured to cause:

determination of one or more of: an interleaving density of the second type symbols, a type of the second modulation alphabet, and a size of the second modulation alphabet, wherein the determination is based on one or more of: a worst case phase drift for the packet, a worst case amplitude variation for the packet, and a required signal quality for the first type symbols to meet a performance target for the packet.

19. The apparatus of item 18, wherein two or more of: the interleaving density of the second type symbols, the type of the second modulation alphabet, and the size of the second modulation alphabet are determined jointly.

20. The apparatus of any of items 18 through 19, wherein the determination fulfills one or more of the following conditions:

the interleaving density increases with increasing worst case phase drift, the interleaving density increases with increasing size of the second modulation alphabet, the size of the second modulation alphabet decreases with increasing worst case phase drift, and the size of the second modulation alphabet decreases with increasing required signal quality.

21. The apparatus of any of items 18 through 20, wherein the controlling circuitry is configured to cause the determination of the interleaving density by causing selection of a distance between second type symbols in the packet, wherein a predicted phase drift associated with the selected distance is lower than half of a minimum phase difference of the second modulation alphabet.

22. The apparatus of item 21, wherein the predicted phase drift associated with the selected distance is:

the worst case phase drift over the selected distance, or the worst case phase drift over half of the selected distance.

23. The apparatus of any of items 18 through 22, wherein the controlling circuitry is configured to cause the determination of the size and/or type of the second modulation alphabet by causing selection of a prospect modulation alphabet, wherein a demodulation performance of the selected prospect modulation alphabet at the required signal quality meets a performance condition.

24. The apparatus of item 23, wherein the performance condition comprises one or more of:

the demodulation performance of the selected prospect modulation alphabet being more robust than a demodulation and error correction decoding performance of the first type symbols at the required signal quality; and the demodulation performance of the selected prospect modulation alphabet being more robust than a threshold value.

25. The apparatus of any of items 18 through 24, wherein the interleaving is in time domain and/or in frequency domain.

26. The apparatus of any of items 18 through 25, wherein data carried by the second type symbols is associated with stricter error rate requirements than data carried by the first type symbols.

27. The apparatus of any of items 18 through 26, wherein the communication parameter estimation comprises a phase error estimation and/or an amplitude error estimation.

28. The apparatus of any of items 18 through 27, wherein the apparatus is for a transmitter of the packet, and wherein the controlling circuitry is further configured to cause transmission of the packet using one or more of: the determined interleaving density of the second type symbols, the determined type of the second modulation alphabet, and the determined size of the second modulation alphabet.

29. The apparatus of item 28, wherein the controlling circuitry is further configured to cause reception of an interleaving request message from an intended receiver of the packet, wherein the determination is responsive to reception of the interleaving request message.

30. The apparatus of any of items 18 through 27, wherein the apparatus is for an intended receiver of the packet, and wherein the controlling circuitry is further configured to cause transmission of an interleaving configuration message to a transmitter of the packet, wherein the interleaving configuration message is indicative of one or more of: the determined interleaving density of the second type symbols, the determined type of the second modulation alphabet, and the determined size of the second modulation alphabet.

31. A receiver apparatus for a packet with second type symbols interleaved amongst first type symbols, wherein the first type symbols comprise error correction encoded data modulated using a first modulation alphabet and the second type symbols are for communication parameter estimation and comprise error correction encoded data modulated using a second modulation alphabet which is smaller than the first modulation alphabet, wherein the data modulated using the second modulation alphabet is encoded with a same error correcting code as the data modulated using the first modulation alphabet, and wherein one or more of: an interleaving density of the second type symbols, a type of the second modulation alphabet, and a size of the second modulation alphabet are based on one or more of: a worst case phase drift for the packet, a worst case amplitude variation for the packet, and a required signal quality for the first type symbols to meet a performance target for the packet, the apparatus comprising controlling circuitry (700) configured to cause:

demodulation of the second type symbols to acquire symbol decisions for the second type symbols; and setting of decoder input soft symbol values for the second type symbols corresponding to the symbol decisions being correct.

32. The apparatus of item 31, wherein the controlling circuitry is further configured to cause one or more of:

application of a phase correction for the packet, wherein the phase correction is based on respective phase differences between the second type symbols and the corresponding symbol decisions, and application of an amplitude correction for the packet, wherein the amplitude correction is based on respective amplitude differences between the second type symbols and the corresponding symbol decisions.

33. The apparatus of item 32, wherein the phase correction for each first type symbol of the packet corresponds to an interpolation of phase differences for two second type symbols and/or wherein the amplitude correction for each first type symbol of the packet corresponds to an interpolation of amplitude differences for two second type symbols.

34. A communication device comprising the communication apparatus of any of items 18 through 30 and/or the receiver apparatus of any of items 31 through 33.

The invention claimed is:

1. A method for a communication apparatus to control interleaving, within a packet for transmission, of second type symbols amongst first type symbols, the method comprising:
    determining one or more of the following parameters:
        an interleaving density of the second type symbols amongst the first type symbols,
        a type of a second modulation alphabet to be used for modulating the second type symbols, and
        a size of the second modulation alphabet, wherein:
        the first type symbols carry a first part of data that is encoded by a first error-correcting code,
        the second type symbols carry a second part of the data that is encoded by the first error-correcting code,
        the second type symbols are for communication parameter estimation, and
        the determining is based on one or more of the following: a worst case phase drift for the packet, a worst case amplitude variation for the packet, and a required signal quality for the first type symbols to meet a performance target for the packet;
    modulating the second part of the encoded data using the second modulation alphabet to obtain the second type symbols for interleaving within the packet; and
    modulating the first part of the encoded data using a first modulation alphabet that is larger than the second modulation alphabet, to obtain the first type symbols for interleaving within the packet.

2. The method of claim 1, wherein two or more of the following parameters are determined jointly: the interleaving density of the second type symbols, the type of the second modulation alphabet, and the size of the second modulation alphabet.

3. The method of claim 1, wherein the determining is performed based on one or more of the following:
    the interleaving density increases with increasing worst case phase drift,
    the interleaving density increases with increasing size of the second modulation alphabet,
    the size of the second modulation alphabet decreases with increasing worst case phase drift, and
    the size of the second modulation alphabet decreases with increasing required signal quality.

4. The method of claim 1, wherein determining the interleaving density comprises selecting a distance in the packet between second type symbols, such that a predicted phase drift associated with the selected distance is lower than half of a minimum phase difference of the second modulation alphabet.

5. The method of claim 4, wherein the predicted phase drift associated with the selected distance is a worst case phase drift over one of the following: the selected distance, or half of the selected distance.

6. The method of claim 1, wherein determining the size of the second modulation alphabet and/or the type of the second modulation alphabet comprises selecting a prospect modulation alphabet having a demodulation performance that meets a performance condition at the required signal quality for the first type symbols.

7. The method of claim 6, wherein the performance condition comprises the demodulation performance being more robust than one or more of the following:
    a demodulation and error correction decoding performance of the first type symbols at the required signal quality; and
    a threshold value.

8. The method of claim 1, wherein one or more of the following applies:
    the data carried by the second type symbols is associated with stricter error rate requirements than the data carried by the first type symbols; and
    the second type symbols are for estimating one or more of the following communication parameters: phase error, and amplitude error.

9. The method of claim 1, further comprising interleaving the first type symbols and the second type symbols in the packet according to the interleaving density of the second type symbols, and transmitting the packet.

10. The method of claim 9, further comprising receiving an interleaving request message from an intended receiver of the packet, wherein the determining the one or more parameters is responsive to receiving the interleaving request message.

11. The method of claim 1, wherein the method is performed by an intended receiver of the packet and further comprises transmitting an interleaving configuration message to a transmitter of the packet, wherein the interleaving configuration message indicates the one or more determined parameters.

12. A method for a receiver apparatus configured to receive a packet having second type symbols interleaved amongst first type symbols, the method comprising:
    demodulating the first and second type symbols, in the received packet, to acquire symbol decisions for the second type symbols and soft symbol values for the first type symbols, wherein:
        the first type symbols carry a first part of data that is encoded by a first error-correcting code and the first type symbols are demodulated using a first modulation alphabet,
        the second type symbols carry a second part of the data that is encoded by the first error-correcting code and the second type symbols are demodulated using a second modulation alphabet that is smaller than the first modulation alphabet,
        the second type symbols are for communication parameter estimation,
        one or more of the following associated with the second type symbols are based one or more conditions associated with the packet: an interleaving density of the second type symbols amongst the first type symbols, a type of the second modulation alphabet, and a size of the second modulation alphabet, and
        the one or more conditions associated with the packet include one or more of the following: a worst case phase drift for the packet, a worst case amplitude variation for the packet, and a required signal quality for the first type symbols to meet a performance target for the packet; and
    decoding data in the received packet based on the acquired soft symbol values for the first type symbols and based on soft symbol values for the second type symbols corresponding to the acquired symbol decisions being correct.

13. The method of claim 12, further comprising one or more of the following:
applying a phase correction for the packet, based on respective phase differences between the second type symbols and the corresponding symbol decisions, and
applying an amplitude correction for the packet, based on respective amplitude differences between the second type symbols and the corresponding symbol decisions.

14. The method of claim 13, wherein one or more of the following applies:
the phase correction applied to each first type symbol of the packet is based on an interpolation of phase differences for two second type symbols of the packet, and
the amplitude correction applied to each first type symbol of the packet corresponds to an interpolation of amplitude differences for two second type symbols of the packet.

15. A communication apparatus configured to control interleaving, within a packet for transmission, of second type symbols amongst first type symbols, the communication apparatus comprising controller circuitry configured to:
determine one or more of the following parameters:
an interleaving density of the second type symbols amongst the first type symbols,
a type of a second modulation alphabet to be used for modulating the second type symbols, and
a size of the second modulation alphabet, wherein:
the first type symbols carry a first part of data that is encoded by a first error-correcting code,
the second type symbols carry a second part of the data that is encoded by the first error-correcting code,
the second type symbols are for communication parameter estimation, and
the determination is based on one or more of the following: a worst case phase drift for the packet, a worst case amplitude variation for the packet, and a required signal quality for the first type symbols to meet a performance target for the packet,
modulate the second part of the encoded data using the second modulation alphabet to obtain the second type symbols for interleaving within the packet; and
modulate the first part of the encoded data using a first modulation alphabet that is larger than the second modulation alphabet, to obtain the first type symbols for interleaving within the packet.

16. The communication apparatus of claim 15, wherein two or more of the following are determined jointly: the interleaving density of the second type symbols, the type of the second modulation alphabet, and the size of the second modulation alphabet.

17. The communication apparatus of claim 15, wherein controller circuitry is further configured to perform the determination based on one or more of the following:
the interleaving density increases with increasing worst case phase drift,
the interleaving density increases with increasing size of the second modulation alphabet,
the size of the second modulation alphabet decreases with increasing worst case phase drift, and
the size of the second modulation alphabet decreases with increasing required signal quality.

18. The communication apparatus of claim 15, wherein the controller circuitry is further configured to determine the interleaving density based on selecting a distance in the packet between second type symbols such that a predicted phase drift associated with the selected distance is lower than half of a minimum phase difference of the second modulation alphabet.

19. The communication apparatus of claim 18, wherein the predicted phase drift associated with the selected distance is a worst case phase drift over one of the following: the selected distance, or half of the selected distance.

20. The communication apparatus of claim 15, wherein the controller circuitry is further configured to determine the size of the second modulation alphabet and/or the type of the second modulation alphabet based on selecting a prospect modulation alphabet having a demodulation performance that meets a performance condition at the required signal quality for the first type symbols.

21. The communication apparatus of claim 20, wherein the performance condition comprises the demodulation performance being more robust than one or more of the following:
a demodulation and error correction decoding performance of the first type symbols at the required signal quality; and
a threshold value.

22. The communication apparatus of claim 15, wherein one or more of the following applies:
the data carried by the second type symbols is associated with stricter error rate requirements than the data carried by the first type symbols; and
the second type symbols are for estimating one or more of the following communication parameters: phase error, and amplitude error.

23. The communication apparatus of claim 15, wherein the apparatus is for a transmitter of the packet, and wherein the controller circuitry is further configured to cause the apparatus to interleave the first type symbols and the second type symbols in the packet according to the interleaving density of the second type symbols, and transmit the packet.

24. The communication apparatus of claim 23, wherein the apparatus is configured to receive an interleaving request message from an intended receiver of the packet, wherein the controlling circuitry is further configured to determine the one or more parameters responsive to receiving the interleaving request message.

25. The communication apparatus of claim 15, wherein the apparatus is an intended receiver of the packet, and wherein the controlling circuitry is further configured to cause of the apparatus to transmit an interleaving configuration message to a transmitter of the packet, wherein the interleaving configuration message indicates the one or more determined parameters.

26. A receiver apparatus configured to receive a packet having second type symbols interleaved amongst first type symbols, the receiver apparatus comprising controller circuitry configured to perform operations corresponding to the method of claim 12.

* * * * *